United States Patent [19]

Debenham, deceased et al.

[11] Patent Number: 4,671,720

[45] Date of Patent: Jun. 9, 1987

[54] CAN END MANUFACTURE

[75] Inventors: Michael Debenham, deceased, late of Victoria; by Patrick S. Carmine, executor, Melbourne; by Barbara S. Debenham, executor; by David Debenham, executor, both of Frankston; Alan G. Dalli, Warrandyte; Peter L. Revill, Middle Park, all of Australia

[73] Assignee: The Broken Hill Proprietary Company Limited, Melbourne, Australia

[21] Appl. No.: 637,041

[22] Filed: Aug. 2, 1984

[30] Foreign Application Priority Data

Aug. 3, 1983 [AU] Australia .............................. PG0648

[51] Int. Cl.[4] .............................................. B21D 51/46
[52] U.S. Cl. .................................. 413/58; 198/689.1; 198/836; 413/52
[58] Field of Search ...................... 413/3, 4, 45, 52, 60, 413/61; 53/313, 314, 315, 316; 198/689, 836

[56] References Cited

U.S. PATENT DOCUMENTS 3,889,801  6/1975  Boyer ................................... 198/689
3,908,572  9/1975  Johnson ................................ 413/52

Primary Examiner—Francis S. Husar
Assistant Examiner—Jerry Kearns
Attorney, Agent, or Firm—Murray and Whisenhunt

[57] ABSTRACT

A can end manufacturing apparatus including an endless belt (1) having spaced apertures (12) for supporting the can ends (C) through the various stages of manufacture, said belt (1) being supported by spring-loaded travel rails (2, 3) arranged in guide slots (4) formed in longitudinally spaced supporting pillars (5) arranged on either side of a die station chamber (6) within which several die stations (7, 8, 9) and a sealant application station (10) are arranged. During each manufacturing operation, the transfer belt (1) is moved vertically so that each can end (C) is brought into engagement with the die stations (7, 8, 9) and the sealant application station (10). During this vertical movement, the atmosphere within the die station chamber (6) is alternatively compressed and rarefied. However, since the supporting pillars (5) for the travel rails (2, 3) are longitudinally spaced, the atmosphere within the die station chamber (6) is able to be adequately vented through said spaces (16) and under the travel rails (2, 3). In this way the disturbance of the atmosphere within the die station chamber (6) is substantially reduced and spatter of sealant during the sealant application stage is significantly reduced.

9 Claims, 6 Drawing Figures

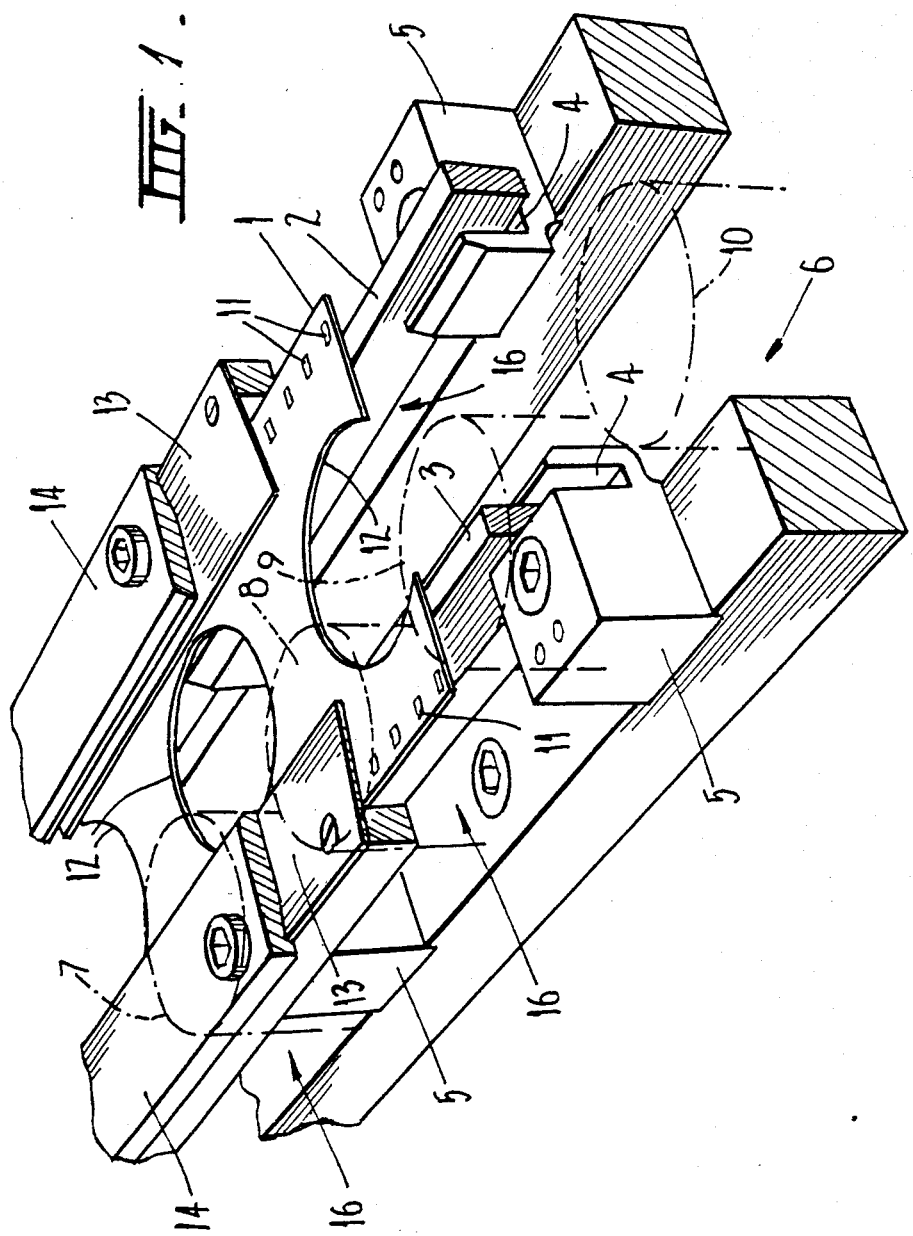

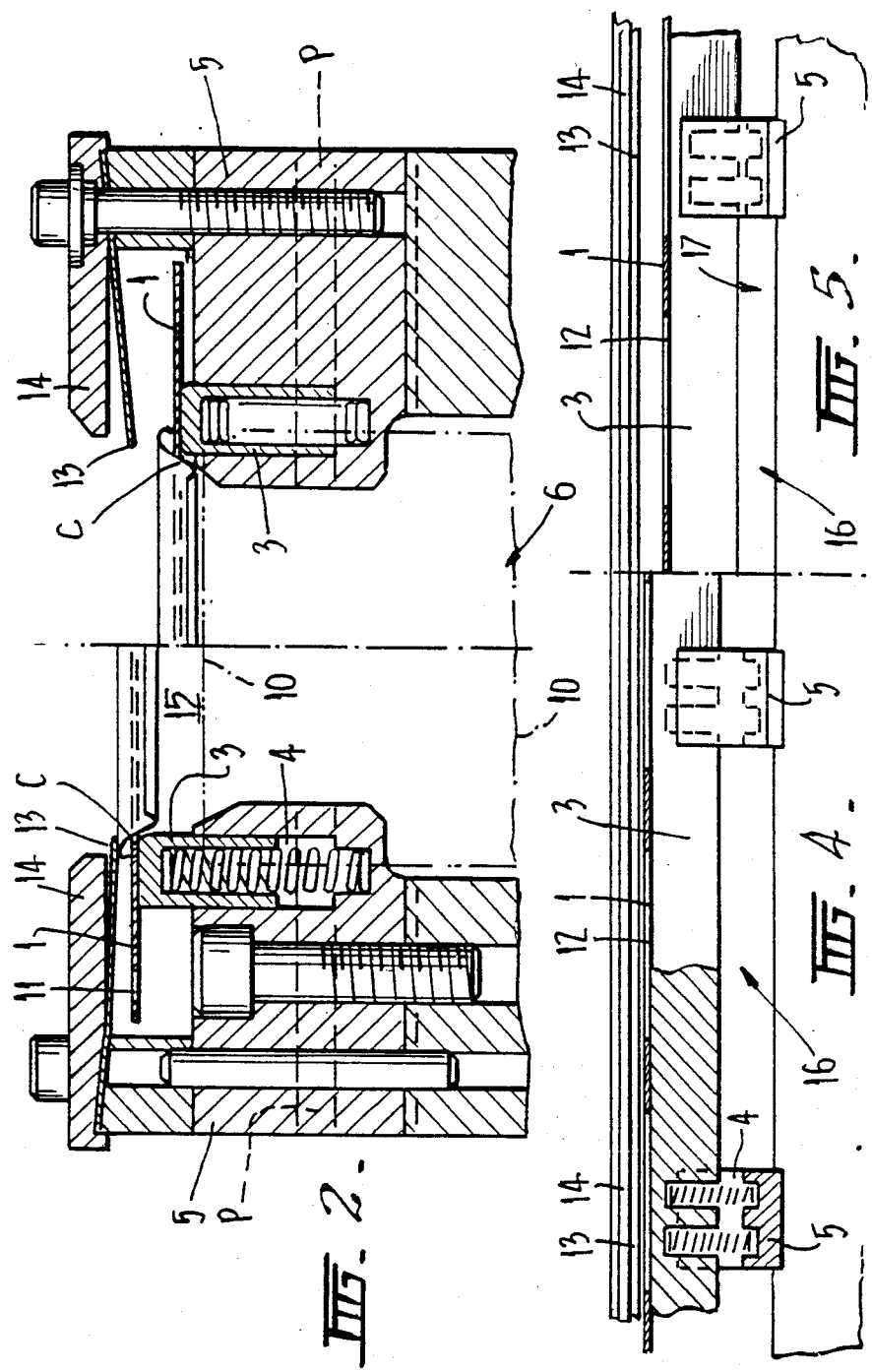

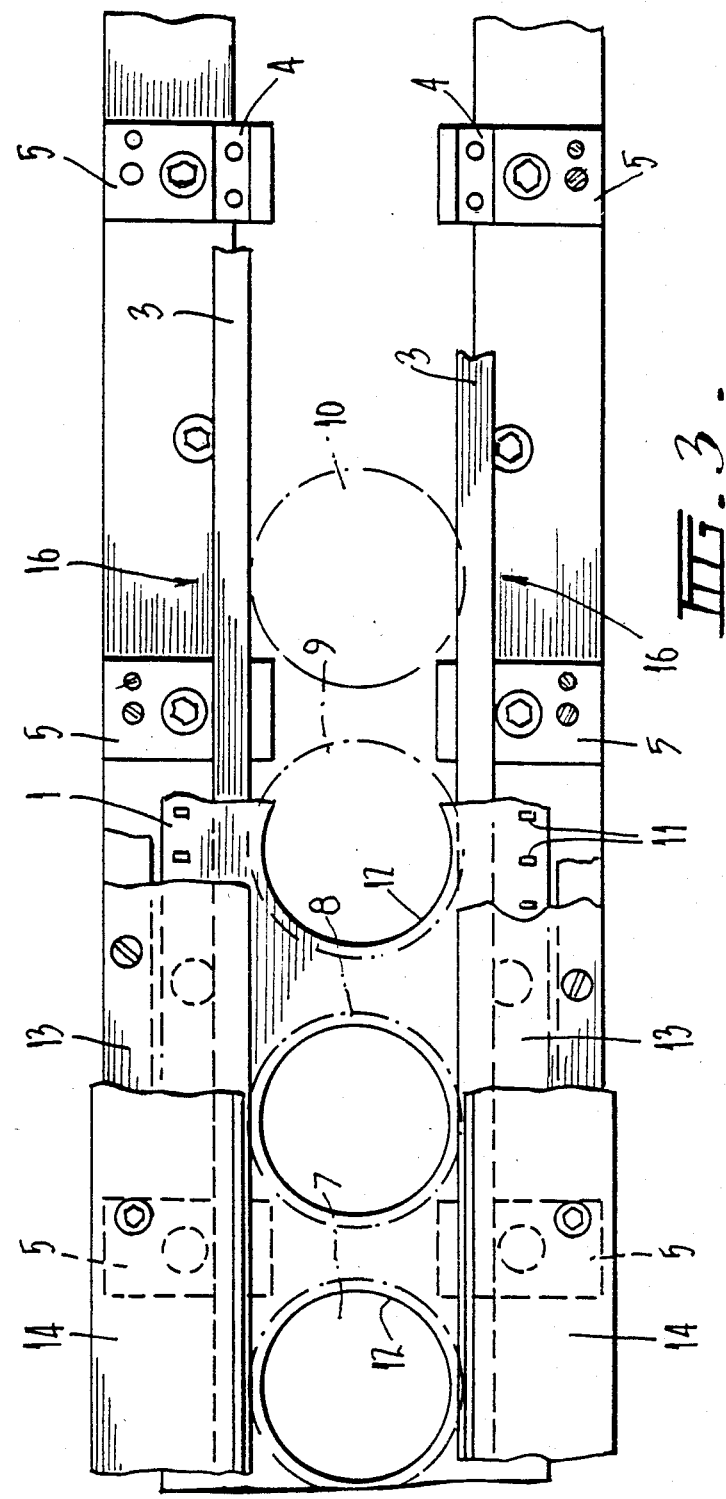

CAN END MANUFACTURE

BACKGROUND OF THE INVENTION

This invention relates to improvements in the manufacture of can ends to which lining compounds, sealant materials and other coating materials, are applied during the manufacturing process.

In the manufacture of push-in easy-opening can ends of the type described in our Australian Pat. Nos. 444,068, 518,940 and 523,783, a sealant compound, such as a pvc plastisol, must be applied in the regions in which the sheet metal has been severed to ensure that the completed can end is capable of providing an hermetic seal. The sealant material is preferably applied by the method described in our Australian Pat. No. 477,562, and this method, with modifications to the means for pumping sealant through the orifice, is the method used in the commercial production of push-in easy-opening can ends in Australia.

In the conversion of the basic can end shell into a push-in easy-opening can end, the end must be subjected to several die operations as well as a sealant application operation. During the manufacturing process, the ends are supported by a rotary or linear indexing mechanism by means of which the ends are transferrred from one stage to another. The die stations and sealant application station are usually located in a chamber which has relatively confined dimensions.

Where the press carrying the conversion dies and sealant applicator is operational at high speeds (for example from 250 to 300 ends per minute) there is a tendency for the sealant applied by the above described method to spatter slightly. Although the degree of spatter experienced is commercially acceptable, it is somewhat unsightly and wasteful and therefore should be avoided if possible at a relatively low cost.

Since other sealant application methods are likely to be affected in a similar manner, the present invention should not be regarded as being restricted to the particular sealant application method referred to above.

Investigations leading to the present invention involved the use of a linear belt transfer system arranged over a series of die stations and a sealant application station. Observation of the transfer belt during its reciprocating movement between the transfer position and the die station engaging position, particularly near the bottom of the press stroke, indicated that it acted like a diaphragm alternately causing compression and rarefaction of the atmosphere surrounding the die and sealant application stations thereby causing a rapid bidirectional flow of air longitudinally of the die sation chamber. This rapid translational movement of air is believed to cause any strings of sealant connecting the sealant applicator head and the can end to be broken and spattered.

Although the above observations relate to one particular form of transfer apparatus, the invention is equally applicable to other forms of transfer apparatus in which the same problem is found to exist. For example, the invention is also applicable to vacuum assisted transfer mechanisms of the type presently manufactured by Stolle.

BRIEF SUMMARY OF THE INVENTION

It is the object of the present invention to provide a can end manufacturing apparatus in which the above problem is at least substantially reduced.

In its broadest aspect, the invention provides a can end manufacturing apparatus including means for supporting and transferring can ends through the various stages of manufacture, said supporting and transferring means moving generally horizontally to transfer the can ends from one manufacturing stage to another and being moved generally vertically during each manufacturing stage, means for applying a coating material to part of said can end, said apparatus being characterized by means for reducing the disturbance of the atmosphere in at least the region of said coating application means during said vertical movement of said supporting and transferring means.

By reducing the disturbance of the air in the region of the coating material application means caused by the vertical movements of the supporting and transfer means, the pressure within said region is more stable and the rapid bidirectional air flows referred to above are substantially reduced.

In one form of the invention, the means for reducing the disturbance of the air in at least the region of said coating application means comprises lateral venting openings formed in the supporting structure for said supporting and transferring means at least in the region of said coating application means.

In another form of the invention, where the supporting and transfer means comprises an endless belt having apertures for supporting the can ends, the means for reducing the disturbance of air in at least the region of said coating material application means comprises the formation of vent apertures in the body of said belt between said can end supporting apertures, the dimensions of said vent apertures being such as to sufficiently reduce the disturbance of the air between the belt and the work station containing the coating material application means during working movements of said belt. It will be appreciated that by forming vent apertures in the belt, the diaphragm-like action of the belt is substantially reduced and the problem of coating material spatter is substantially avoided.

Where the invention is applied to a transfer system in which the ends are held in position by negative pressure generated under the transfer belt, the changes in pressure of the air in the die station and sealant application station chamber under the transfer belt caused by vertical movements of the belt are reduced by increasing the size and/or number of air withdrawal openings in the chamber under the belt. By removing restrictions on air flow to and from the manifold connected to the negative pressure generating system, the pressure within the chamber is stabilized and the disturbance of the air, particularly the rapid bidirectional air flows in the longitudinal direction of the chamber, is reduced thereby reducing the adverse effects on the sealant application process.

In another aspect, the present invention provides a transfer belt for a can end manufacturing apparatus, comprising a series of apertures for supporting the can ends and characterized by venting apertures positioned between said can ends supporting apertures.

In a preferred form, the region of belt between said can end supporting apertures is formed with a pair of venting apertures approximately 19 mm. in diameter.

BRIEF DESCRIPTION OF THE DRAWINGS

Several presently preferred forms of the invention are shown somewhat schematically in the accompanying drawings, in which:

FIG. 1 is a perspective view of a can end transfer system embodying the invention;

FIG. 2 is a fragmentary sectional end elevation of the apparatus of FIG. 1 showing the transfer belt in the elevated or transfer position and in the depressed or die operation/sealant application position;

FIG. 3 is a plan view of the apparatus of FIGS. 1 and 2;

FIGS. 4 and 5 are fragmentary side elevations of the apparatus in the elevated and depressed positions respectively.

DESCRIPTION OF THE PREFERRED EMBODIMENTS

Figure 6:
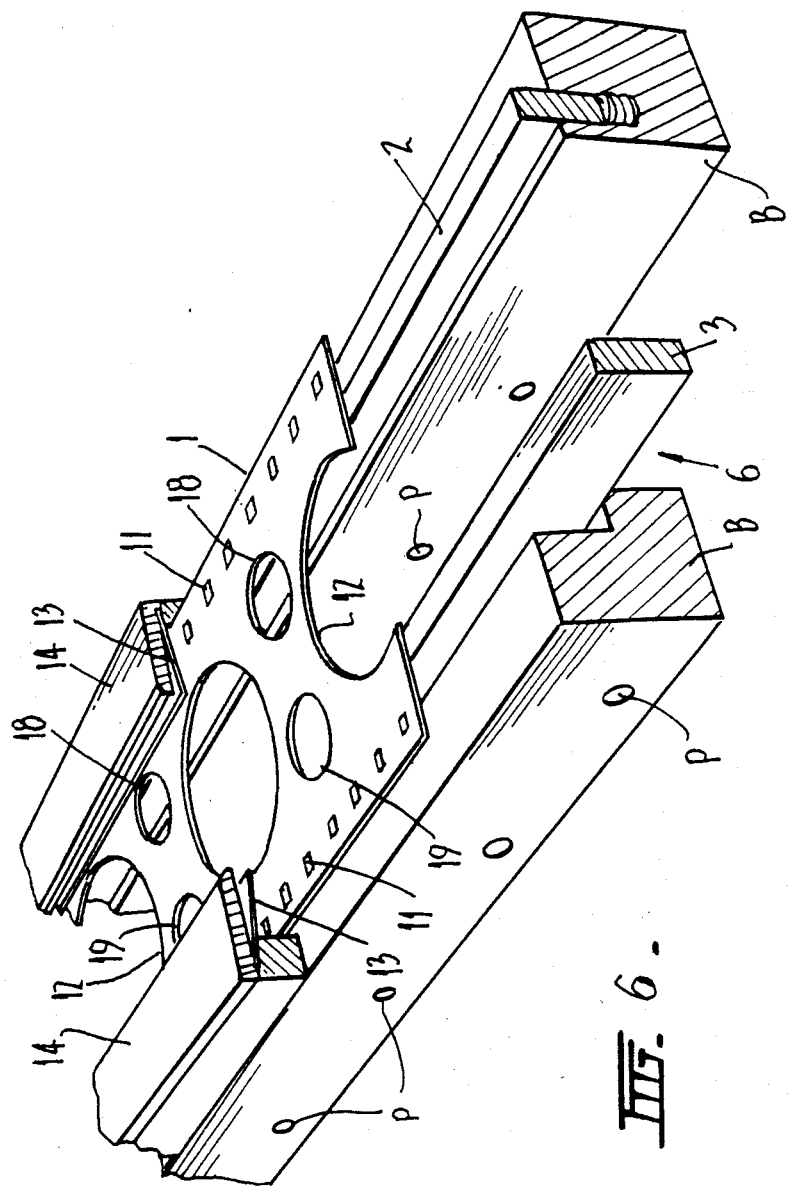
FIG. 6 is a schematic sectional perspective view of a can transfer system showing an alternative embodiment of the invention.

Referring firstly to FIGS. 1 to 5 of the drawings, the transfer system comprises an endless metallic belt 1 supported by spring loaded travel rails 2, 3 arranged in guide slots 4 in longitudinally spaced supporting pillars 5 arranged on either side of a die station chamber 6 within which several die stations 7, 8 and 9 and a sealant application station 10 are arranged. It will be appreciated that the die stations and sealant application station are shown purely schematically in the various figures of the drawings.

The transfer belt 1 is formed with sprocket holes 11 adjacent its edges by means of which the belt 1 is driven by the transfer drive mechanism (not shown). The belt 1 is also formed with a series of can end receiving apertures 12 within which the can ends C to be converted to push-in easy opening can ends, and to which a sealant is to be applied at the sealant application station 10, are supported. The transfer belt thus far described is a standard transfer belt of the type commonly used in Stolle transfer systems.

The can ends C are held in position in the apertures 12 as the transfer belt 1 transfers the can ends C from station to station by means of resilient can end retaining strips 13 overlying the belt 1 and located under vertical movement limiting covers 14. The function of the strips 13 is more fully described in the specification of our co-pending Australian Patent Application No. 83566/82.

Consideration of the end elevation of FIG. 2 of the drawings will show that an air space 15 exists between the transfer belt 1, can ends C and the stations 7 to 10 and the die station chamber 6. It will be appreciated that as the transfer belt 1 is moved from its transfer or belt up position shown in FIG. 2 of the drawings to its operative or belt down position shown in the right hand portion of FIG. 2, the air trapped in the air space 13 will be displaced by the diaphragm-like action of the transfer belt 1 and the retained can ends C. Similarly, during the return movement of the belt 1, air will be drawn into the air space 15. Since under normal circumstances the trapped air can only escape from and be drawn in at either end of the die station chamber, and since the air space 15 is relatively small, a rapid bidirectional movement of air occurs along the length of the die station chamber, particularly when the transfer mechanism is operating at a high speed. Thus, since the sealant material being applied to the can ends C at the sealant application station 10 is relatively viscous and tends to develop strings between the sealant application head and the can end, these strings will tend to be broken by the rapid air movement along the length of the die station chamber thereby causing undesirable spatter.

This problem is overcome according to the presently preferred embodiment of the invention by supporting the travel rails 2, 3 in guide slots 4 in longitudinally spaced supporting pillars 5 rather than in continuous supporting blocks, as will be found in the existing transfer equipment of this type (see FIG. 6 of the drawings). The spaces 16 between the pillars 5 are open laterally and therefore leave openings for the ingress and egress of air during the vertical movements of the transfer belt 1. It will be noted from a comparison of FIGS. 4 and 5 that when the belt is in the down position and the springs supporting the travel rails 2, 3 are fully compressed, an opening 17 is still present between the bottom of the travel rails 2, 3 and the adjacent supporting structure to allow for adequate air circulation into and out of the chamber 6. Although the opening 17 is somewhat exaggerated in the present drawings, for reasons of greater clarity, in actual practice the opening 17 is of the order of 12 mm. deep and this has been found to be quite adequate to reduce the disturbance of the atmosphere in the chamber 6 and substantially prevent the undesirable sealant spatter referred to above.

In another embodiment of the invention, the above problem is overcome by forming venting apertures 18, 19 in the transfer belt 1 between the can end receiving apertures 12 and on either side of the centreline of belt 1. In the present embodiment, venting apertures approximately 19 mm. in diameter are found to satisfactorily reduce sealant spatter to a minimum by reducing the disturbance of air trapped in the air space 13 caused by movement of the transfer belt 1. In some cases it may be necessary or desirable to combine the venting apertures of this embodiment with the features of the embodiment of FIGS. 1 to 5 of the drawings.

As an alternative to the above embodiments, air venting passageways P, the positioning of which shown in broken outline in FIGS. 2 and 6 of the drawings, may be formed in the continuous rails B supporting the spring-loaded rails 4, 5 and positioned at least in the region of the sealant application station 10, for example on either side of the station 10. It may of course be preferable to form the air venting passageways P along the length of the die station chamber to ensure that the air trapped further along the die station chamber is adequately vented (see FIG. 6). Once again this embodiment may be combined with the embodiment of FIG. 6.

Where the transfer apparatus incorporates a negative air pressure generating means connected to the die station chamber to hold the can ends C in position on the transfer belt 1, the sealant spatter problem may be avoided by increasing the side and/or number of outlets from the die station chamber to the negative air pressure generating means. By reducing the restriction on air flow into and out of the die station chamber, the pressure of the air within the air space 15 and in the chamber is maintained at a more constant level and the bidirectional movement of air will be significantly reduced thereby reducing sealant spatter.

What we claim is:

1. In a can end manufacturing apparatus including support means for supporting and transferring can ends through various stages of manufacture by moving generally horizontally to transfer the can ends from one manufacturing stage to another and moving generally vertically in a coating manufacturing stage, coating means for applying a coating material to part of said can ends at the coating manufacturing stage, said support means including means defining a region of confined atmosphere substantially surrounding said can ends at said coating manufacturing stage, said confined atmosphere being disturbed by said generally vertical movement of said support means, the improvement wherein said support means has vent means provided in the region of the coating means for reducing the disturbance of the confined atmosphere at least in the region of the coating means by venting the confined atmosphere during vertical movement of the support means.

2. Apparatus of claim 1, including support structure means supporting said support means, said vent means comprising lateral venting openings extending from the region beneath the support means and laterally through the support structure means at least in the region of said coating means.

3. Apparatus of claim 1, wherein said support means is an endless belt having a plurality of apertures therein supporting said can ends, said vent means comprising a plurality of apertures formed in the body of said belt between the can end support apertures, the dimensions of the vent apertures being chosen such as to sufficiently reduce the disturbance of air between the belt and the coating means during vertical movement of the belt.

4. Apparatus of claim 1, including negative pressure generating means for generating a negative pressure under said support means to hold said can ends in position, said negative pressure generating means including air withdrawal passages, at least one of the size and number of air withdrawal passages being increased so that changes in pressure of the air under the support means is reduced.

5. Apparatus of claim 1, wherein said support means comprises an endless belt, said supporting structure means includes spring-loaded travel rails mounted in vertical guide slots, said vent means being provided by forming said guide slots in supporting pillars, to define lateral venting openings between said pillars and under said rails.

6. Apparatus of claim 1, wherein said support means includes an endless belt, ssaid supporting structure means including spring-loaded travel rails mounted in vertical guide slots in supports which are longitudinally continuous on either side of the endless belt, said supporting structure means and said belt defining therebetween a closed chamber, said vent means being formed in said travel rail supports at least on either side of said coating means and between springs for spring-loading the travel rails.

7. In a can end manufacturing apparatus including support means for supporting and transferring can ends through various stages of manufacture, said support means moving generally horizontally to transfer the can ends from one manufacturing stage to another and being moved generally vertically during each manufacturing stage, coating means for applying a coating material to part of said can ends at one of said manufacturing stages, said support means including means defining a region of confined atmosphere substantially surrounding said can ends at said one manufacturing stage, said confined atmosphere being disturbed by said generally vertical movement of said support means, the improvement wherein said support means has atmosphere venting openings provided at least in the region of said coating application means through which said confined atmosphere may be vented during said vertical movements of said supporting and transferring means to thereby reduce the disturbance of said atmosphere at least in the region of said coating application means.

8. In a can end manufacturing apparatus including support means for supporting and transferring can ends through various stages of manufacture by moving generally horizontally to transfer the can ends from one manufacturing stage to another and moving generally vertically in a coating maufacturing stage, coating means for applying a coating material to part of said can ends at the coating manufacturing stage, said said support means including means defining a region of confined atmosphere substantially surrounding said can ends at said coating manufacturing stage, said confined atmosphere being disturbed by said generally vertical movement of said support means, the improvement comprising:
a transfer belt, a drive means for moving said belt, said belt including a series of apertures for supporting the can ends, cooperation means for cooperating with the drive means for moving the belt, said belt having a plurality of venting apertures positioned between the can end supporting apertures, said venting apertures being smaller in size than said can end support apertures.

9. Apparatus of claim 8, wherein each region of the belt between the can end supporting apertures has a pair of vent apertures approximately 19 mm in diameter therein, the vent apertures of each pair being positioned on either side of the longitudinal center line of the belt.

* * * * *